May 23, 1961     G. HERR ET AL     2,984,875
DOOR WELT-SEALING
Filed Aug. 8, 1957     2 Sheets-Sheet 1
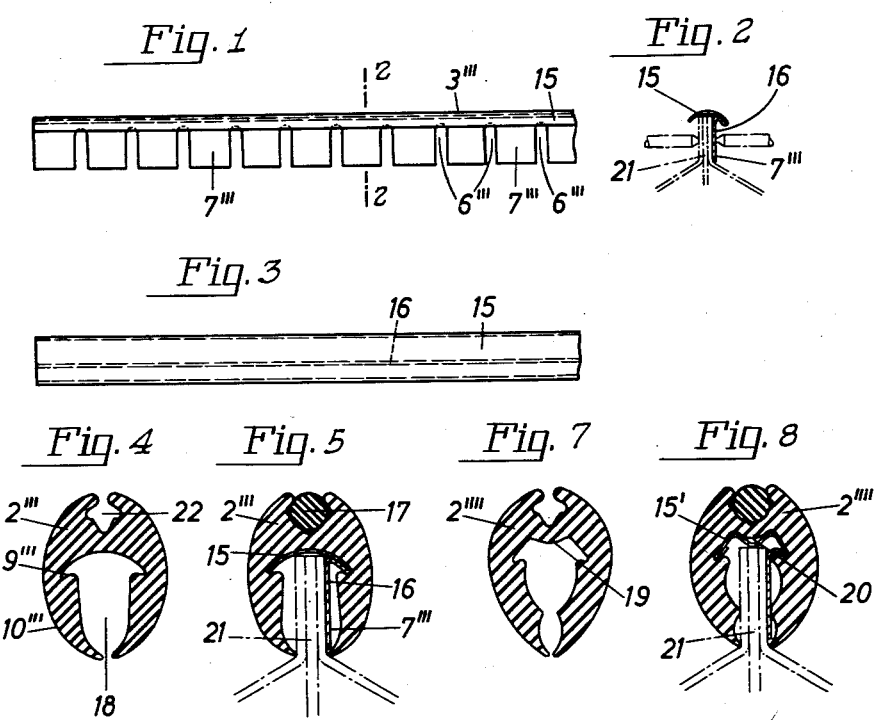

May 23, 1961 G. HERR ET AL 2,984,875
DOOR WELT-SEALING
Filed Aug. 8, 1957 2 Sheets-Sheet 2
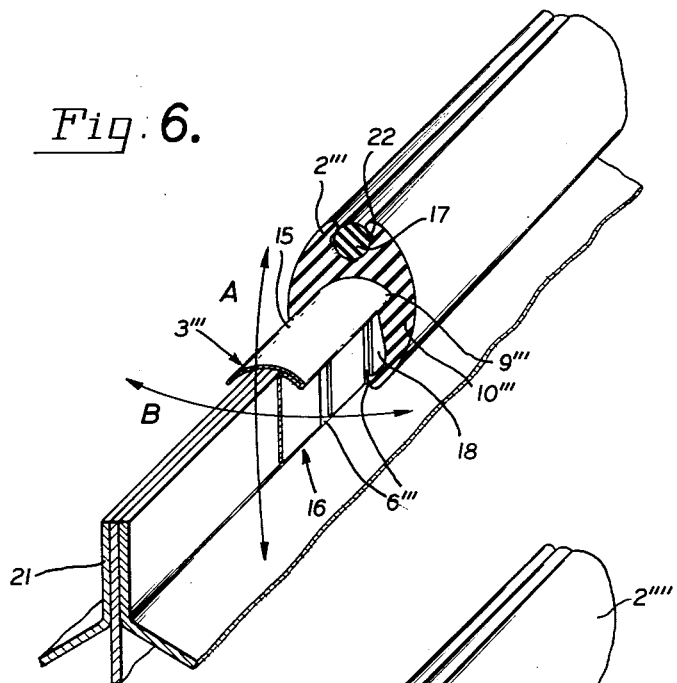
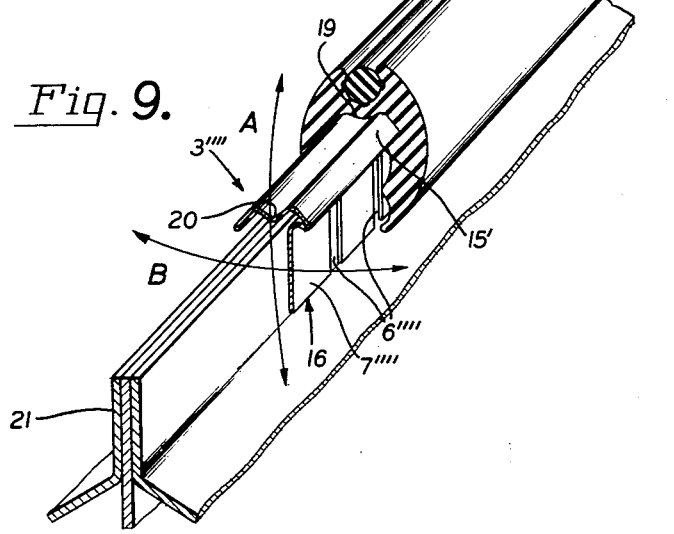
INVENTORS
GERHARD HERR
KURT CZIPTSCHIRSCH
BY
ATTORNEY.

United States Patent Office 2,984,875
Patented May 23, 1961

2,984,875
DOOR WELT-SEALING

Gerhard Herr, Wuppertal-Vohwinkel, and Kurt Cziptschirsch, Wuppertal-Elberfeld, Germany, assignors to Firma Gebr. Happich G.m.b.H., Wuppertal-Elberfeld, Germany, a corporation of Germany Filed Aug. 8, 1957, Ser. No. 676,962

Claims priority, application Germany Aug. 9, 1956

7 Claims. (Cl. 20—69)

The present invention relates to a door-welt sealing which comprises a metal strip carrying a resiliently-deformable cover by means of laps projecting from said strip.

Such webs carrying a resilient cover are used not only for sealing of automobile doors, but also for the protection of projecting, sharp-edged metal flanges. The resilient cover provides first of all in the last-mentioned application a protection against accidents.

In order to avoid the expensive and insufficiently holding clamps, it has been proposed to secure the web-like, metallic carrier to the welt by means of welding.

It is one object of the present invention to provide a door-welt sealing of a design favorable for securing by welding, as well as for the holding of the sealing profile, and comprising a metal carrying strip of T-cross-section which forms with its crosswise slotted legs the welding tongues, while the web portion engaging the welt enters with its two longitudinal edges, inner longitudinal grooves of the resilient cover. Such door-welt sealing, which may be used generally as edge covering, has also a bending possibility into the substantially occurring bending directions.

The manufacture of the metal carrying bead of the conventional sheet metal is made possible, since an inwardly projecting auxiliary web is bent off the edge of the bead, the welding tongues extending from said auxiliary web set-off the longitudinal median plane of the bead and parallel to the latter.

It is another object of the present invention to provide a door-welt sealing which brings about an extremely stable structure which simultaneously complies with the requirements for bending and which comprises a strip curved symmetrically to its vertical longitudinal median line, the welding tongues of which are disposed on one side of the longitudinal median line and spaced apart from each other, the welding tongues being formed of sections of the leg portions cut free up to the auxiliary web. The curvature of the bead may be single, yet a plurality of such curvatures may be provided which are disposed symmetrically to the longitudinal median plane. The stability obtained by the curvature permits of arranging of the welding tongues spaced apart from each other.

A favorable form of the curvature of the bead is obtained, in accordance with the present invention, by arranging the same roof-like and the leg portion being set-off laterally for about half of the thickness of the welt relative the longitudinal median line of the bead. Due to this formation, the welt is symmetrically covered, so that upon corresponding symmetrical formation of the covering profile, a completely symmetrical seat of the latter is obtained on the welt.

A stable structure is achieved by providing the roof-like bead along its longitudinal median with a groove directed towards the welt.

This groove can contribute in a favorable manner simultaneously to the perfect seat of the covering profile on the carrying bead, by providing, in accordance with the present invention, a rib entering the longitudinal groove of the bead and disposed on the inside of the covering profile.

With these and other objects in view which will become apparent in the following detailed description, the present invention will be clearly understood in connection with the accompanying drawings, in which:

Figure 1 is a front elevation of a bead;
Fig. 2 is a section along the lines 2—2 of Fig. 1;
Fig. 3 is a top plan view of the web side of the bead;
Fig. 4 is a cross section of the basic profile of the rubber sealing bead at enlarged scale;
Fig. 5 is a cross section of the finally mounted bead in addition to the rubber sealing profile;
Fig. 6 is a perspective side view of the finally mounted bead with the rubber sealing member, shown in Fig. 5;
Fig. 7 is another embodiment of the basic profile wherein the inner side of the recess has a longitudinally disposed holding lip;
Fig. 8 is a corresponding cross section of the arrangement of Fig. 7 showing the finally mounted rubber sealing on the corresponding bead; and
Fig. 9 is a perspective side view of the arrangement shown in Fig. 8.

Referring now to drawing, and in particular to Figs. 1–6, the bead $3'''$ formed of a T-shaped cross section and made preferably of sheet metal, has a leg 16 which has crosswise disposed slots $6'''$ arranged at more or less great distances. In this manner the welding tongues $7'''$ are formed. The latter are secured to the welt flanges of the door frame by means of electrical point welding, as is indicated in Fig. 2.

The web 15 of the T-shaped bead $3'''$ has smooth longitudinal edges and a base formation. It serves the purpose of carrying the rubber sealing profile $2'''$, which is shown in Fig. 4 in its basic configuration. The leg 16 of the bead is preferably set-off laterally for the thickness of the welt relative to the longitudinal median of the web, in order to bring about a symmetrical covering of the welt. The sealing profile $2'''$ is provided inside the recess 18, which is complementary to the profile of the bead, with a longitudinal cut-in $9'''$. The flanges $10'''$ terminate lip-like, in order to achieve a good elastic engagement at the throat of the welt.

The sealing profile $2'''$ is equipped in the longitudinal median plane in its bead with a channel 22 receiving a separating filler 17.

After welding the bead $3'''$ to the welt edges 21, the basic profile $2'''$ of the rubber door sealing is mounted with sealing projections (Fig. 5), and upon engagement of the edges of the web 15 in the cut-in $9'''$, the profile $2'''$ is reinforced by insertion of a separating filler 17. The rubber sealing is thus solidly retained by the bead.

In order to assure the linear arrangement of the rubber sealing profile, a further modification may be provided, as shown in Figs. 7 to 9, according to which the base carrying web $15'$ of the bead $3'''$ is formed at its center with a channel 20 directed towards the welt 21. The leg 16 has again crosswise disposed slots $6''''$ to form welding tongues $7''''$ therebetween. The rubber profile $2''''$ has in this case an additional rib 19 which is received by the channel 20 and which is disposed inside of the rubber profile.

The web $15'$ may assume other configurations, for instance may be even or be formed with angular longitudinal edges, in which case the rubber profile receives a complementary configuration.

Figs. 6 and 9 show in perspective views two embodiments of the present invention and indicate quite clearly the preferred bending possibility of the bead.

In the embodiment shown in Fig. 6, the bending possibility in the direction of the arrow is enhanced by the concave curving of the bead, without, however, disturbing the bending possibility in the direction of the arrow A. Thus a rather favorable solution is brought about by the present invention, which permits the bending of the bead in two mainly required directions.

The same applies also to the embodiment disclosed in Fig. 9, where the web 15 is equipped with a longitudinal channel 20.

In both embodiments the leg of the bead does not prevent the bending possibility in the direction of the arrow A, in view of the slots 6''' and 6'''', respectively.

While I have disclosed several embodiments of the present invention, it is to be understood that these embodiments are given by example only and not in a limiting sense, the scope of the present invention being determined by the objects and the claims.

We claim:

1. A door-welt sealing comprising a metal bead carrying an elastic cover, said metal bead being welded to said welt, said bead being of T-cross-section, the leg portion of said bead having a plurality of crosswise disposed slots and forming a welding tongue between each pair of adjacent slots, and the head portion of said bead forming a longitudinal strip, the latter extending to opposite sides of said leg portion of said bead, and said elastic cover having inner longitudinal grooves, the latter receiving the continuous longitudinal edges of said strip.

2. A door-welt sealing comprising a metal bead carrying an elastic cover, said metal bead being welded to said welt, said bead being of T-cross-section, the leg portion of said bead having a plurality of crosswise disposed slots and forming a welding tongue between each pair of adjacent slots, and the head portion of said bead forming a longitudinal strip, the latter extending to opposite sides of said leg portion of said bead, and said elastic cover having inner longitudinal grooves, the latter receiving the continuous longitudinal edges of said strip, and an auxiliary web projecting inwardly from one longitudinal edge of said strip, said welding tongues projecting from said auxiliary web being set-off relative to the longitudinal median line of said strip.

3. A door-welt sealing comprising a metal bead carrying an elastic cover, said metal bead being welded to said welt, said bead being of T-cross-section, the leg portion of said bead having a plurality of crosswise disposed slots and forming a welding tongue between each pair of adjacent slots, and the head portion of said bead forming a longitudinal strip, the latter extending to opposite sides of said leg portion of said bead, and said elastic cover having inner longitudinal grooves, the latter receiving the continuous longitudinal edges of said strip, an auxiliary web projecting inwardly from one longitudinal edge of said strip, said welding tongues projecting from said auxiliary web being set-off relative to the longitudinal median line of said strip, and said slots in the leg portion of said bead extending upwardly to said auxiliary web.

4. A door-welt sealing comprising a metal bead carrying an elastic cover, said metal bead being welded to said welt, said bead being of T-cross-section, the leg portion of said bead having a plurality of crosswise disposed slots and forming a welding tongue between each pair of adjacent slots, and the head portion of said bead forming a longitudinal strip, the latter extending to opposite sides of said leg portion of said bead, and said elastic cover having inner longitudinal grooves, the latter receiving the continuous longitudinal edges of said strip, and said leg portion of said bead being laterally offset for about half of the thickness of said welt relative to the median line of said bead.

5. A door-welt sealing comprising a metal bead carrying an elastic cover, said metal bead being welded to said welt, said bead being of T-cross-section, the leg portion of said bead having a plurality of crosswise disposed slots and forming a welding tongue between each pair of adjacent slots, and the head portion of said bead forming a longitudinal strip, the latter extending to opposite sides of said leg portion of said bead, said elastic cover having inner longitudinal grooves, the latter receiving the continuous longitudinal edges of said strip, and said head portion of said bead being concavely curved towards said leg portion.

6. A door-welt sealing comprising a metal bead carrying an elastic cover, said metal bead being welded to said welt, said bead being of T-cross-section, the leg portion of said bead having a plurality of crosswise disposed slots and forming a welding tongue between each pair of adjacent slots, and the head portion of said bead forming a longitudinal strip, the latter extending to opposite sides of said leg portion of said bead, said elastic cover having inner longitudinal grooves, the latter receiving the continuous longitudinal edges of said strip, said head portion of said bead being concavely curved towards said leg portion having along its center-line a groove directed towards said welt.

7. A door-welt sealing comprising a metal bead carrying an elastic cover, said metal bead being welded to said welt, said bead being of T-cross-section, the leg portion of said bead having a plurality of crosswise disposed slots and forming a welding tongue between each pair of adjacent slots, and the head portion of said bead forming a longitudinal strip, the latter extending to opposite sides of said leg portion of said bead, said elastic cover having inner longitudinal grooves, the latter receiving the continuous longitudinal edges of said strip, said head portion of said bead being concavely curved towards said leg portion and having along its center-line a groove directed towards said welt, and said elastic cover having a longitudinal rib received by said groove of said head portion of said bead.

References Cited in the file of this patent

UNITED STATES PATENTS

| 2,295,444 | Woodward | Sept. 8, 1942 |
| 2,602,202 | Orr | July 8, 1952 |

FOREIGN PATENTS

| 652,706 | Great Britain | May 2, 1951 |
| 655,268 | Great Britain | July 18, 1951 |